Patented Mar. 15, 1949

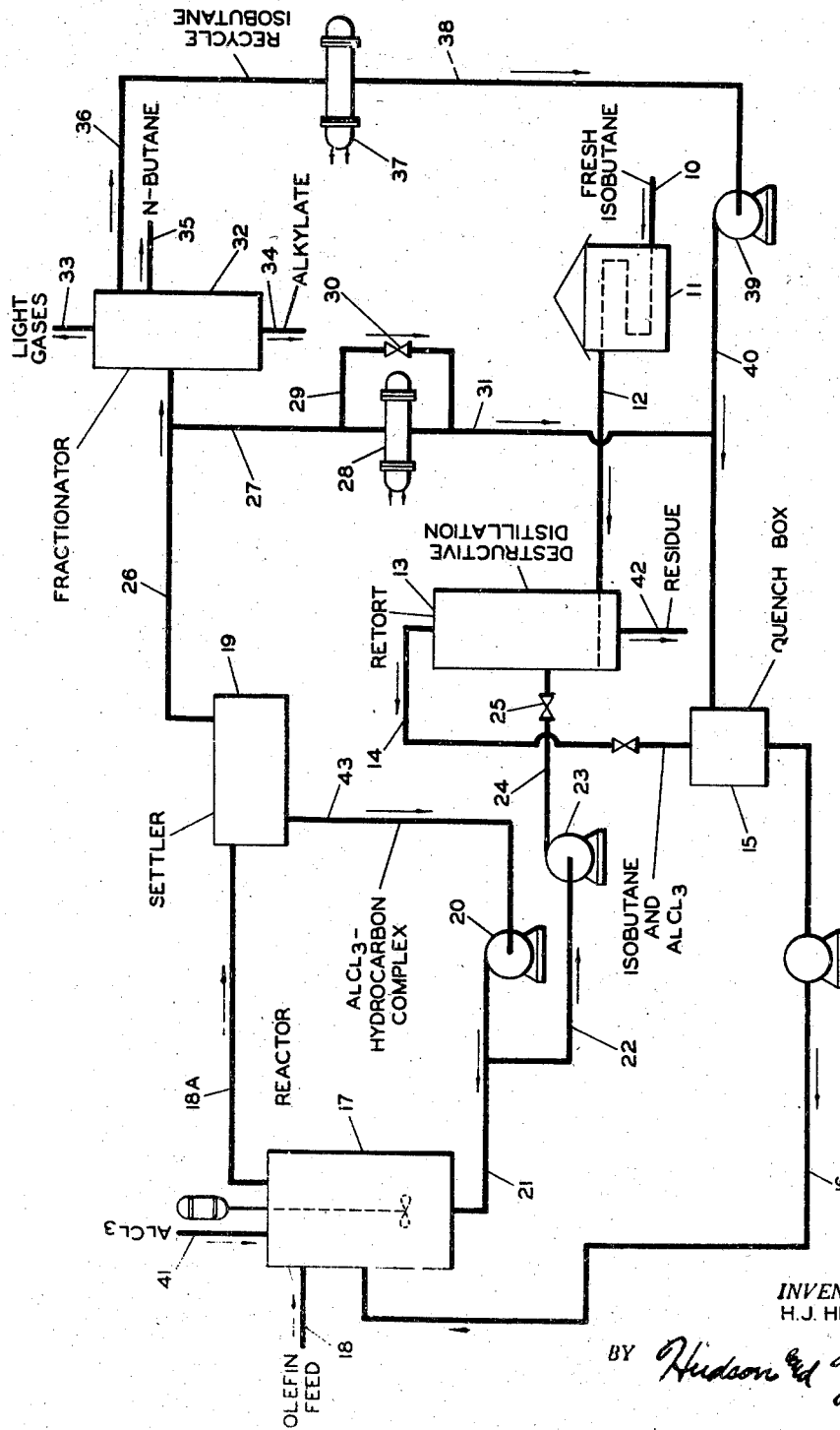

2,464,682

UNITED STATES PATENT OFFICE 2,464,682

RECOVERY OF ALUMINUM HALIDE FROM ALUMINUM HALIDE-HYDROCARBON COMPLEX

Harold J. Hepp, Bartlesville, Okla., assignor to Phillips Petroleum Company, a corporation of Delaware Application October 1, 1945, Serial No. 619,648

12 Claims. (Cl. 260—683.4)

This invention relates to hydrocarbon conversion processes and particularly to alkylation of isoparaffins, especially isobutane, with low-boiling normally gaseous aliphatic olefins, especially ethylene or mixtures of ethylene and propylene, with a catalyst composed of an aluminum halide-hydrocarbon complex, almost invariably an aluminum chloride complex. More particularly it relates to the recovery of aluminum halide, especially aluminum chloride, from excess aluminum halide-hydrocarbon complex formed in an alkylation process and simultaneously treating fresh isoparaffin feed, especially isobutane, to remove impurities therefrom.

The principal object of the present invention is to provide an improved hydrocarbon conversion process wherein an aluminum halide-hydrocarbon complex is employed as the catalyst. Another object is to provide an economical and efficient combination alkylation process for the alkylation of isobutane and/or isopentane with ethylene and/or propylene using an aluminum chloride-hydrocarbon complex catalyst. Another object is to provide a process of the foregoing type wherein pretreatment of the isoparaffin feed and recovery of aluminum chloride from the withdrawn excess complex for use in refortifying the complex in the reaction zone are accomplished simultaneously and in a single step. Another object is to provide an improved method of effecting pretreatment of isoparaffin, alkylation with ethylene and/or propylene, and recovery of aluminum chloride for use in refortification of the complex. Many other objects will more fully hereinafter appear.

The accompanying drawing portrays a simplified diagram of one specific embodiment of my invention as applied to the alkylation of isobutane with ethylene to make diisopropyl.

My invention is applied to any hydrocarbon conversion process wherein a hydrocarbon feed is intimately contacted with a liquid aluminum halide-hydrocarbon complex catalyst under conditions such as to effect conversion of the hydrocarbon feed, and liquid aluminum halide-hydrocarbon complex catalyst phase is withdrawn from the conversion zone, usually by settling the conversion effluent into a hydrocarbon phase, generally liquid, and a liquid complex catalyst phase. The improvement of my invention comprises passing at least a portion of the withdrawn catalyst phase to a destructive distillation zone and there destructively distilling it to liberate aluminum halide while passing incoming hydrocarbon feed in gaseous form and preferably preheated to a temperature of from 450 to 750° F. or slightly thereabove through the complex undergoing destructive distillation. Passage of the gaseous hydrocarbon through the complex during destructive distillation thereof effects purification of the hydrocarbon feed and also carries the liberated aluminum halide out of the destructive distillation zone substantially immediately after it is formed. The resulting gaseous mixture of volatilized aluminum halide and purified hydrocarbon feed is passed to the conversion zone as a source of hydrocarbon feed and fortification aluminum halide therefor. Usually this mixture is cooled to a suitably low temperature before being fed to the reaction zone. I have found that this cooling may be effected in a particularly advantageous manner by recovering unreacted isoparaffin in liquid form from the effluent of an alkylation zone and commingling it with the hot gaseous isoparaffin-aluminum halide mixture leaving the destructive distillation zone in such proportions as to yield a mixture of liquid isoparaffin and aluminum halide.

The hydrocarbon feed passed in gaseous form through the complex being distilled should be composed predominantly of hydrocarbon which is inert in the destructive distillation zone, that is which is unaffected and unchanged under the conditions prevailing therein. Generally speaking, the paraffins and naphthenes are the only hydrocarbons which meet these requirements. Ordinarily, paraffins and naphthenes having not more than six carbon atoms are preferable since these are more refractory than heavier hydrocarbons. More commonly I employ the normally gaseous paraffins having four carbon atoms or less such as normal butane, isobutane, propane, ethane, methane and mixtures thereof in any combination and proportions. The hydrocarbon used should be resistant to cracking, disproportionation, reversion or other reaction at temperatures of from 450 to 750° F. or slightly thereabove so that it will withstand the preheating step as well as the destructive distillation of the complex.

The invention is most readily applied to alkylation of an isoparaffin with an olefin with an aluminum halide-hydrocarbon complex, in which case the isoparaffin feed, or a suitable portion thereof, is employed as the carrier gas in the destructive distillation step and at the same time is freed of impurities which would be objectionable in the alkylation step. However, it may be applied to any hydrocarbon conversion in which a hydrocarbon feed is converted with an aluminum halide-hydrocarbon complex and wherein the hydrocarbon feed contains impurities which are harmful in the conversion step and is inert under the conditions of the preheating and destructive distillation. Examples of other types of conversion are the isomerization of normal paraffins such as normal butane, normal pentane and normal hexane to their iso-forms, reconstruction of paraffins, cracking, decomposition reactions, alkylation of naphthenes, condensations, and any conversion wherein a liquid aluminum halide-hydrocarbon complex may be withdrawn from the reaction zone and destructively distilled with a stream of incoming hydrocarbon feed passing through it to accomplish simultaneous purification of the feed and removal of the liberated aluminum halide.

Numerous reactions are known in which anhydrous aluminum chloride is advantageously used as a catalyst. Among these is the alkylation of isoparaffins and naphthenes with olefins. The aluminum chloride may be used in several forms. In some processes the aluminum chloride is supported on a solid support, such as bauxite, and in others the aluminum chloride is utilized per se. A common form of the aluminum chloride catalyst is the liquid hydrocarbon complex. This complex is usually a dark, mobile liquid, which is easily contacted with the hydrocarbon to be converted in a reaction vessel equipped with a mechanical mixer or jet mixer. In many of those processes in which the aluminum chloride is added to the reaction vessel in the granular form, in the course of the reaction it is converted to the liquid hydrocarbon complex, and thus is effectively used in this form.

During the course of the reaction, the aluminum chloride-hydrocarbon complex loses activity, and fresh anhydrous aluminum chloride is added to the complex to increase its activity. The fortified complex, on further reaction, loses activity, and additional complex is formed through reaction of the fortification aluminum chloride with hydrocarbons. In a continuous process, anhydrous aluminum chloride is continuously added to the complex to maintain the activity of the complex, and the excess complex, formed by the reaction of the aluminum chloride used for fortification with the hydrocarbons present, is removed continuously at a rate equal or substantially equal to that at which complex is being formed in order to keep the amount of complex in the system at a constant level.

In a typical diisopropyl manufacturing operation isobutane is alkylated with ethylene using a liquid aluminum chloride-hydrocarbon complex catalyst originally made by mixing aluminum chloride and kerosene in the weight ratio of 8 to 5. As the operation progresses the original complex catalyst is replaced with complex catalyst formed in the process and containing aluminum chloride and hydrocarbon in the ratio of about 1 to 1. The reactor, settler and associated equipment contain from 7000 to 9000 gallons of the complex. The reaction effluent is withdrawn to the settling equipment from which liquid complex phase is withdrawn at the rate of about 4,000,000 gallons per day. Approximately 900 gallons per day of the withdrawn complex phase is discarded as representing the "swelling" of the complex in the reaction and settling system due to refortification with aluminum chloride to keep the activity up and reaction of the fortifying aluminum chloride with hydrocarbon to form additional complex. The balance of the withdrawn complex is recycled to the reactor. Fresh aluminum chloride is added in any suitable way to the reactor at the rate of 4800 to 5500 pounds per day to keep the activity at a suitably high level and the aluminum chloride content of the complex at from 50 to 70%. The alkylation is conducted at a pressure sufficiently high to maintain all the hydrocarbons in liquid phase, for example, at 375 to 450 pounds per square inch gage, a temperature of 80 to 150° F. and in the presence of a trace of added HCl as a promoter.

The present invention is based on the fact that at least a portion of the aluminum chloride present in the fluid aluminum chloride-hydrocarbon complex is recoverable as anhydrous aluminum chloride by destructive distillation. Thus, by a destructive distillation of the excess catalyst complex withdrawn from the reaction zone, at least a portion of the aluminum chloride in this excess complex may be recovered and reused in the fortification of the catalyst remaining in the reaction zone.

The destructive distillation is carried out in a retort heated above 400° F., and preferably to at least 450° F., temperatures between 500° and 750° F. being sufficient to recover 50 to 70 per cent of the aluminum chloride in the anhydrous form suitable for re-use in catalyst fortification.

During the destructive distillation of the complex, it is advantageous to blow through the complex a carrier gas in order to assist in carrying the sublimed aluminum chloride out of the retort. By this means, the partial pressure of the aluminum chloride in the retort is reduced and more rapid decomposition of the complex is favored. Since aluminum chloride is a solid at temperatures below about 375° F., subliming at about 360° F. at one atmosphere pressure, it is seen that a carrier gas gives the added advantage of lowering the temperature at which a solid phase will deposit from a vaporized stream of aluminum chloride.

I have now discovered that in an isobutane-olefin alkylation unit in which aluminum chloride is used as the catalyst and recovery by destructive distillation of aluminum chloride from excess complex formed in the reaction is practiced, substantial purification of the fresh feed isobutane can be effected simultaneously with the aluminum chloride recovery from the excess catalyst complex by the use of the fresh feed isobutane as the carrier gas in the destructive distillation operation.

As the withdrawn complex is heated at an elevated temperature under conditions such as to effect destructive distillation thereof and volatilization of the aluminum chloride liberated from the complex, a gaseous preheated stream of the isobutane feed is passed through the complex. The gaseous isobutane thus introduced into the complex acts as a carrier to carry off aluminum chloride from physical and/or chemical combination in the complex, and aids in the liberation by favorably displacing both the physical and the chemical equilibria for aluminum chloride by removing the aluminum chloride as fast as it is set free from the complex.

While the process of the present invention is especially applicable to the alkylation with ethylene or with propylene or mixtures of ethylene and propylene, it is not limited thereto. It may be applied to the alkylation with olefins higher than propylene such as any of the three butylenes or amylenes.

The process of the present invention is ordinarily applied to the alkylation of isobutane and isopentane since these are the most economical and most readily available isoparaffins; however, the alkylation of higher isoparaffins is within the scope of the present invention.

While aluminum chloride is most commonly employed, other suitable aluminum halides which form catalytically active complexes with hydrocarbons, especially aluminum bromide, may be employed in practicing the invention.

The following discussion is not to be interpreted as limiting my invention, but is intended to give a better understanding of this invention. The invention will be described in the preferred embodiment wherein it is applied to the alkylation of isobutane with ethylene, using a liquid aluminum chloride-hydrocarbon complex catalyst, to give diisopropyl alkylate. Methods of conducting such an alkylation are described in detail in the copending application of C. R. Ringham, Ser. No. 556,208, filed September 28, 1944, now Pat. No. 2,409,389, and in my copending applications, Ser. No. 541,758, filed June 23, 1944, now Pat. No. 2,410,498, and Ser. No. 614,575, filed September 5, 1945. Alkylation of isobutane with ethylene with such a catalyst to make diisopropyl is also described in U. S. patents to Carmody et al. 2,308,560 and 2,354,652, Marschner et al. 2,308,561 and 2,308,562, Ostergaard 2,320,293, Chenicek 2,360,547, and Evering 2,361,368. Attention is directed to the above-cited applications and patents for details of the alkylation step which does not per se constitute my invention. Methods of carrying out this type of alkylation are now well within the skill of the art, having been extensively practiced for a number of years on a commercial scale.

In an ethylene-isobutane alkylation system in which the catalyst is a liquid AlCl3-hydrocarbon complex, C4 olefins are difficult to handle even in minor proportions. These olefins react with aluminum chloride in the reaction system to form a complex of low activity, and thereby reduce the catalyst life realized in carrying out this reaction. Due to the fact that isobutane is recovered from numerous refinery streams, such as butanes from cracking operations, the fresh feed isobutane for this alkylation plant may contain an intolerably high proportion of C4 olefins. By the practice of my invention, these deleterious olefins may readily be removed without additional equipment or increased operating costs. In addition, organic sulfur compounds are broken down to yield the relatively innocuous H2S, the released olefin being destroyed, and other impurities such as water or oxygen- or nitrogen-containing impurities are removed.

The present invention is further advantageous since it accomplishes removal of unsaturated compounds from the isoparaffin, especially olefins, diolefins and acetylenes. The presence of C4 and higher olefins and of diolefins and acetylene in aluminum chloride-catalyzed alkylation processes of the type to which the present invention is applied is highly objectionable since they destroy catalyst activity, this effect being accompanied by polymerization, sludge formation and an excessive increase in viscosity of catalyst. Diolefins are especially undesirable.

Referring to the drawing, ethylene is added through pipe 18 to reactor 17 operated at a pressure at least sufficient to maintain substantially liquid phase and containing a reaction mixture of isobutane, reaction product, a minor proportion of light hydrocarbons, and the liquid aluminum chloride-hydrocarbon complex catalyst. Intimate contact is maintained between the catalyst and the hydrocarbon by mechanical agitation. Activating aluminum chloride is added to reactor 17 through pipe 41 from a source not shown. The reaction mixture of hydrocarbons and complex are removed from the reactor through pipe 18A to settler 19, where the mixture separates by gravity to form an upper layer of hydrocarbon and a lower layer of catalyst. The catalyst is withdrawn from settler 19 through pipe 43 to pump 20, and thence through pipe 21 is returned to reactor 17.

The hydrocarbon phase is removed from settler 19 through pipe 26. From a T in pipe 26, a portion of the stream is removed for a recycle temperature control stream and conducted through pipe 27 to cooler 28, and thence to pipe 31. Cooler 28 is by-passed by pipe 29, containing valve 30, so that a constant stream may be carried in the recirculation system, though the proportion to be cooled may be varied by valve 30, thus maintaining the desired temperature in the reactor 17. The recirculation stream is conducted by pipe 31 to pipe 40, thence to quench box 15, the operation of which is hereinafter explained, and thence by pipe 16 back to reactor 17, thus serving to control reaction temperature.

The remainder of the hydrocarbon removed from settler 19 is conducted by pipe 26 to fractionation zone 32, where the pentane-and-heavier product is removed through pipe 34 to storage means, not shown. Light gases are removed through pipe 33 and may be used as fuel. Normal butane, if present, is removed through pipe 35 and may be isomerized to isobutane or used in any other desired manner. Isobutane concentrate is removed through pipe 36 to condenser 37, and then conducted through pipe 38 to pump 39, to pipe 40 where it joins the recirculation hydrocarbon stream and follows a previously described path. This isobutane is in liquid form and in quench box 15 effects quenching of the hot gaseous isobutane-aluminum chloride stream flowing in line 14 to give a liquid stream which flows via line 16 back to reactor 17.

Fresh feed isobutane separated from various refinery or natural gasoline plant streams enters the unit through pipe 10. This stream has not been treated to remove the olefins and other impurities contained therein in such proportions as to be detrimental to the most efficient operation of the plant. The isobutane stream is conducted to heater 11, where it is heated to the desired temperature, and thence conducted by pipe 12 to retort 13, preferably entering through a plurality of openings in the lower section of retort 13. A stream of the catalyst layer separated in unit 19 and flowing in line 43 is charged to retort 13 via line 22, pump 23 and line 24 containing valve 25. Retort 13 is heated by the hot isobutane to 450° F. to 750° F. As heat is supplied to the retort by the hot isobutane, it is necessary that the isobutane enter the retort at a temperature sufficiently above the operating temperature of retort 13 to maintain the retort at operating temperature and heat the complex as it is added.

The isobutane passes through the hot complex and the residue of the decomposed complex, the highly reactive olefins reacting to form substantially saturated hydrocarbons. The mechanism by which these olefins are converted to saturated hydrocarbons is not completely understood, but may be by polymerization to higher olefins and subsequent cracking with carbon deposition. The net effect, however, is the elimination of olefinic material and the formation of substantially saturated hydrocarbons.

The aluminum chloride complex in the retort undergoes a decomposition in which the products are anhydrous aluminum chloride, substantially saturated hydrocarbons, hydrogen, hydrogen chloride and either a heavy but still fluid sludge or coke. The hydrogen chloride, the hydrogen, the hydrocarbons, and the aluminum chloride are carried out with the isobutane through pipe 14, and the coke remains in the retort when maximum aluminum chloride recovery is practiced. However, it is frequently desirable to recover a somewhat smaller proportion of the available aluminum chloride in order to maintain the residual sludge in a fluid condition and thus facilitate its removal from the system as by line 42. This involves the use of lower temperatures or shorter heating times in the aluminum chloride recovery step, as is disclosed in the copending application of another and myself, Serial No. 634,053, filed Dec. 10, 1945.

In the particular embodiment of my invention being considered here, the retort is operated at substantially the pressure of alkylation system, the pressure difference being just sufficient to overcome friction in the piping carrying the products of the decomposition reaction. However, the operation at lower pressures is not excluded, although pressure is preferably maintained sufficiently high that the isobutane condenses to a liquid upon cooling to the desired temperature.

In the manufacture of diisopropyl by the alkylation of isobutane with ethylene with an aluminum chloride-hydrocarbon complex the pressure maintained in the reaction zone commonly ranges from 375 to 450 pounds per square inch gage. The pressure in the destructive distillation zone is ordinarily slightly higher, say 10 to 25 pounds higher.

Through pipe 14 the hydrogen, the hydrogen chloride, the aluminum chloride, and the hydrocarbons are conducted to quench box 15, where the hot vapors are quenched by the recirculation stream. Consequently the aluminum chloride vapor condenses to a finely divided solid and is carried as such in the stream, the remainder of the vapors being condensed and/or dissolved on contact with the recirculation stream. The total stream is removed from quench box 15 through pipe 16, and follows a previously described path to reactor 17, where the aluminum chloride recovered from the decomposition of the excess complex serves as fortification aluminum chloride for the complex catalyst in the reaction system.

Numerous other embodiments are practicable, and this invention is not to be limited to this one particular illustration.

I have found that by heating the complex to 750° F. in a system similar to the above-described system for about one hour, a recovery of about 70 per cent of the aluminum chloride will be obtained, while heating to 500° F. requires about twelve to eighteen hours for the same recovery of aluminum chloride.

Any suitable apparatus may be used for carrying out the destructive distillation of the aluminum chloride-hydrocarbon complex. Since the selection of suitable equipment and materials of construction is well within the present skill of the art, details thereof need not be given here.

The present invention has to do with aluminum halide-hydrocarbon complex which is to be distinguished from aluminum halide sludge of the type produced as a waste by-product in the high temperature cracking of hydrocarbons with aluminum halide. While the complex is not a material of precise chemical compositions, i. e., is not a single chemical compound and may contain aluminum halide and hydrocarbon in widely varying ratios, it is an active component of the reaction mixture whereas sludge of the above type may be defined as a reaction product not exhibiting characteristics of any of the active components of the reaction mixture. Sludge of the above type is not an active catalyst and will not promote hydrocarbon conversions, even though it contains aluminum halide. It is a product which has no value and must be discarded whereas complex, even its least active form, may be re-fortified with aluminum halide for use as a catalyst. The sludge exhibits characteristics resembling those of "B. S.," that is, of a material of high carbon-hydrogen ratio. The sludge is tarry and highly viscous and quite often a solid at room temperature, has a black sheen, and is inactive as a catalyst.

I claim:

1. In a hydrocarbon conversion process wherein a hydrocarbon feed is intimately contacted with a liquid aluminum halide-hydrocarbon complex catalyst to effect conversion of said hydrocarbon feed, and wherein a liquid complex catalyst phase is withdrawn from the conversion zone, the improvement which comprises passing at least a portion of said withdrawn complex catalyst phase to a destructive distillation zone and there destructively distilling same at a temperature above 400° F. to liberate aluminum halide, and passing incoming hydrocarbon feed in gaseous form and containing impurities detrimental in said conversion process comprising at least one compound selected from the class consisting of organic sulfur compounds and unsaturated hydrocarbons through said complex during destructive distillation thereof to effect removal of said impurities from said incoming hydrocarbon feed and carry liberated aluminum halide out of the destructive distillation zone, and passing the resulting hydrocarbon-aluminum halide mixture to the conversion zone as a source of hydrocarbon feed and fortification aluminum halide therefor.

2. In a hydrocarbon conversion process wherein a hydrocarbon feed is intimately contacted with a liquid aluminum halide-hydrocarbon complex catalyst to effect conversion of said hydrocarbon feed, the conversion effluent is withdrawn and separated into a hydrocarbon phase and a liquid complex catalyst phase, and a portion of said complex catalyst phase is recycled to the conversion step, the improvement which comprises passing another portion of said complex catalyst phase to a destructive distillation zone and there destructively distilling same at a temperature of at least 450° F. to liberate aluminum halide, and passing incoming hydrocarbon feed in gaseous form and containing impurities detrimental in said conversion process comprising at least one compound selected from the class consisting of organic sulfur compounds and unsaturated hydrocarbons through said complex during destructive distillation thereof to effect removal of said impurities from said incoming hydrocarbon feed and carry liberated aluminum halide out of the destructive distillation zone, and passing the resulting hydrocarbon-aluminum halide mixture to the conversion zone as a source of hydrocarbon feed and fortification aluminum halide therefor.

3. In an alkylation process wherein an isoparaffin and a low-boiling aliphatic olefin are intimately contacted with a liquid aluminum halide-hydrocarbon complex catalyst under conditions effecting alkylation of said isoparaffin with said olefin, and wherein a liquid complex phase is separated from the alkylation effluent, the improvement which comprises passing at least a portion of said separated complex catalyst phase to a destructive distillation zone and there destructively distilling same at a temperature of at least 450° F. to liberate aluminum halide, and passing incoming isoparaffin feed in gaseous form and containing impurities detrimental in said alkylation process comprising at least one compound selected from the class consisting of organic sulfur compounds and unsaturated hydrocarbons through said complex undergoing destructive distillation to effect removal of said impurities from said incoming hydrocarbon feed and carry liberated aluminum halide out of the destructive distillation zone, and passing the resulting isoparaffin-aluminum halide mixture to the alkylation zone as a source if isoparaffin and fortification aluminum halide therefor.

4. In an alkylation process wherein an isoparaffin and a low-boiling aliphatic olefin are intimately contacted with a liquid aluminum chloride-hydrocarbon complex catalyst under conditions effecting alkylation of said isoparaffin with said olefin, and wherein a liquid complex phase is separated from the alkylation effluent, the improvement which comprises passing at least a portion of said separated complex catalyst phase to a destructive distillation zone and there destructively distilling same at a temperature of at least 450° F. to liberate aluminum chloride, and passing incoming isoparaffin feed in gaseous form and containing impurities detrimental in said alkylation process comprising at least one compound selected from the class consisting of organic sulfur compounds and unsaturated hydrocarbons through said complex undergoing destructive distillation to effect removal of said impurities from said incoming hydrocarbon feed and carry liberated aluminum chloride out of the destructive distillation zone, and passing the resulting isoparaffin-aluminum chloride mixture to the alkylation zone as a source of isoparaffin and fortification aluminum chloride therefor.

5. In an alkylation process wherein isobutane and a low-boiling olefin comprising predominantly ethylene, any other olefin present being propylene, are intimately contacted with a liquid aluminum chloride-hydrocarbon complex catalyst under conditions effecting alkylation of said isoparaffin with said olefin to give a product comprising predominantly isohexane which is composed predominantly of diisopropyl, the alkylation effluent is separated into a liquid hydrocarbon phase and a liquid aluminum chloride-hydrocarbon complex catalyst phase, and a portion of said complex catalyst phase is recycled to the alkylation zone, the improvement which comprises passing another portion of said complex catalyst phase to a destructive distillation zone and there destructively distilling same at a temperature of at least 400° F. to liberate aluminum chloride therefrom, passing the entire isobutane feed in gaseous form and preheated to a temperature sufficiently high to supply the heat of distillation through the complex undergoing destructive distillation, said isobutane feed being contaminated with impurities deleterious in said alkylation, said impurities comprising at least one compound selected from the class consisting of organic sulfur compounds and unsaturated hydrocarbons, passage of said gaseous isobutane feed through said complex effecting removal of said impurities from said isobutane feed and carrying the liberated aluminum chloride from the destructive distillation zone, and passing the resulting isobutane-aluminum chloride mixture to the alkylation zone as a source of isobutane and fortification aluminum chloride therefor.

6. In an alkylation process wherein an isoparaffin and a low-boiling aliphatic olefin are intimately contacted with a liquid aluminum chloride-hydrocarbon complex catalyst under conditions effecting alkylation of said isoparaffin with said olefin, and wherein a liquid complex catalyst phase is separated from the alkylation effluent, the improvement which comprises passing at least a portion of said separated complex catalyst phase to a destructive distillation zone and there destructively distilling the same at a temperature of from 450 to 750° F. to liberate aluminum chloride, passing incoming isoparaffin feed in gaseous form and preheated to a temperature sufficiently above the distilling temperature to maintain said distilling temperature through said complex undergoing distillation, said isoparaffin feed containing impurities detrimental in said alkylation process, said impurities comprising at least one compound selected from the class consisting of organic sulfur compounds and unsaturated hydrocarbons, said passage of said isoparaffin feed through said complex serving to effect removal of said impurities from said isoparaffin feed and to carry liberated aluminum chloride out of the destructive distillation zone as fast as it is set free from the complex, and passing the resulting isoparaffin-aluminum chloride mixture to the alkylation zone as a source of isoparaffin and fortification aluminum chloride therefor.

7. In an alkylation process wherein an isoparaffin and a low-boiling aliphatic olefin comprising predominantly ethylene, any other olefin present in the alkylation zone being propylene, are intimately contacted with a liquid aluminum chloride-hydrocarbon complex catalyst under conditions effecting alkylation of said isoparaffin with said olefin, and wherein a liquid complex catalyst phase is separated from the alkylation effluent, the improvement which comprises passing at least a portion of said separated complex catalyst phase to a destructive distillation zone and there destructively distilling same at a temperature of from 450 to 750° F. aluminum chloride, passing the incoming isoparaffin feed in gaseous form and containing olefins having at least 4 carbon atoms per molecule which are deleterious in said alkylation process through said complex undergoing destructive distillation to effect simultaneous removal of said olefins having at least 4 carbon atoms per molecule from said incoming isoparaffin feed and removal of the liberated aluminum chloride from the destructive distillation zone as fast as it is formed, and passing the resulting isoparaffin-aluminum chloride mixture to the alkylation zone as a source of isoparaffin and fortification aluminum chloride therefor.

8. In an alkylation process wherein an isoparaffin and a low-boiling aliphatic olefin comprising predominantly ethylene, any other olefin present in the alkylation zone being propylene, are intimately contacted with a liquid aluminum chloride-hydrocarbon complex catalyst under conditions effecting alkylation of said isaparaffin with said olefin, and wherein a liquid complex catalyst phase is separated from the alkylation effluent, the improvement which comprises passing at least a portion of said separated complex catalyst phase to a destructive distillation zone and there destructively distilling same at a temperature of from 450 to 750° F., passing the incoming isoparaffin feed in gaseous form through said complex undergoing destructive distillation, said isoparaffin feed containing organic sulfur compounds which would poison the alkylation reaction, said isoparaffin feed being preheated to a temperature sufficiently above the destructive distillation temperature to maintain same, passage of said isoparaffin feed through said complex undergoing distillation serving to effect removal of said organic sulfur compounds from said isoparaffin feed and to carry liberated aluminum chloride out of the destructive distillation zone as fast as it is set free, and passing the resulting isoparaffin-aluminum chloride mixture to the alkylation zone as a source of isoparaffin and fortification aluminum chloride therefor.

9. An alkylation process which comprises intimately contacting an isoparaffin and a low-boiling aliphatic olefin with a liquid aluminum chloride-hydrocarbon complex catalyst under conditions effecting alkylation of said isoparaffin with said olefin, withdrawing the alkylation effluent and allowing same to separate into a liquid hydrocarbon phase and a liquid complex catalyst phase, fractionating said hydrocarbon phase to separately recover fractions of unreacted isoparaffin and of alkylate, recycling a portion of said complex catalyst phase to the alkylation zone, passing a portion of said complex catalyst phase to a destructive distillation zone and there destructively distilling same at a temperature of at least 450° F. under such conditions as to liberate aluminum chloride, passing the entire incoming isoparaffin feed in gaseous form and preheated to a temperature sufficient to supply the heat of destructive distillation through said complex undergoing destructive distillation, said isoparaffin feed containing impurities deleterious in said alkylation, said impurities comprising at least one compound selected from the class consisting of organic sulfur compounds and unsaturated hydrocarbons, passage of said incoming isoparaffin feed through said complex serving to effect removal of said impurities from said isoparaffin feed and to carry liberated aluminum chloride out of the destructive distillation zone as fast as it is set free, liquefying said unreacted isoparaffin fraction, commingling the hot gaseous isoparaffin-aluminum chloride mixture leaving the destructive distillation zone with said liquid unreacted isoparaffin and thereby quenching said hot gaseous isoparaffin-aluminum chloride mixture and giving a liquid mixture of isoparaffin and aluminum chloride, and feeding said liquid mixture of isoparaffin and aluminum chloride directly to the alkylation zone as a source of isoparaffin and fortification aluminum chloride therefor.

10. In an alkylation process wherein isobutane is alkylated with ethylene with a liquid aluminum chloride-hydrocarbon complex catalyst at a pressure of from 375 to 450 pounds per square inch gauge to give diisopropyl, and wherein a liquid complex catalyst phase is separated from the alkylation effluent, the improvement which comprises passing a portion of said separated complex catalyst phase to a destructive distillation zone and there destructively distilling same at a temperature of at least 450° F. and at a pressure of from 10 to 25 pounds per square inch higher than the pressure at which said alkylation is conducted, passing incoming isobutane feed in gaseous form and preheated to a temperature sufficiently above the temperature of the destructive distillation to supply the heat of destructive distillation and maintain said temperature through said complex undergoing distillation, said incoming isobutane feed containing unsaturated hydrocarbons deleterious in said alkylation, passage of said incoming isobutane fed through said complex serving to effect removal of said impurities from said incoming isobutane feed and to carry liberated aluminum chloride out of the destructive distillation zone as fast as it is set free, and passing the resulting isobutane-aluminum chloride to the alkylation zone as a source of isobutane and fortification aluminum chloride therefor.

11. In an alkylation process wherein isobutane and a low-boiling aliphatic olefin comprising predominantly ethylene, any other olefin present in the alkylation zone being propylene, are intimately contacted with a liquid aluminum chloride-hydrocarbon complex catalyst under conditions effecting alkylation of said isobutane with said olefin to form alkylate comprising predominantly isohexane which is comprised predominantly of diisopropyl, and wherein a liquid complex catalyst phase is separated from the alkylation effluent, the improvement which comprises passing at least a portion of said separated complex catalyst phase to a destructive distillation zone and there destructively distilling same at a temperature of about 750° F. for a period of time of about 1 hour to liberate aluminum chloride therefrom, passing the entire incoming isobutane feed in gaseous form through said complex undergoing destructive distillation, said isobutane feed containing unsaturated hydrocarbons deleterious in said alkylation and being preheated to a temperature sufficiently above the distillation temperature to maintain same, passage of said isobutane feed through said complex serving to effect removal of said impurities from said incoming isobutane feed and to carry liberated aluminum chloride out of the destructive distillation zone as fast as it is set free, recovering a fraction of unreacted isobutane in liquid form from a portion of the hydrocarbon phase contained in the alkylation effluent, adjusting the temperature of another portion of said hydrocarbon phase so as to control the temperature of alkylation, commingling the said unreacted isobutane and said last-named portion of said hydrocarbon phase and intimately contacting the hot gaseous isobutane-aluminum chloride mixture leaving the destructive distillation zone with the resulting mixture to give a liquid mixture, and passing said liquid mixture to the alkylation zone as a source of isobutane and fortification aluminum chloride therefor and as a means of temperature control therefor.

12. A process according to claim 9 wherein the impurities comprise unsaturated hydrocarbons.

HAROLD J. HEPP.

REFERENCES CITED

The following references are of record in the file of this patent:

UNITED STATES PATENTS

| Number | Name | Date |
|---|---|---|
| 2,348,408 | Page | May 9, 1944 |
| 2,393,569 | Ross et al. | Jan. 22, 1946 |
| 2,400,669 | Tsao | May 21, 1946 |

Certificate of Correction

Patent No. 2,464,682.

March 15, 1949.

HAROLD J. HEPP

It is hereby certified that errors appear in the printed specification of the above numbered patent requiring correction as follows:

Column 7, line 72, for the word "compositions" read *composition*; column 9, line 16, claim 3, for "source if" read *source of*; column 10, line 48, claim 7, after 750° F." insert *to liberate*;

and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*